US008713686B2

(12) United States Patent
Kane (10) Patent No.: US 8,713,686 B2
(45) Date of Patent: Apr. 29, 2014

(54) SYSTEM AND METHOD FOR REDUCING ANTIVIRUS FALSE POSITIVES

(75) Inventor: John P. Kane, Saint James, NY (US)

(73) Assignee: CA, Inc., Islandia, NY (US)

( * ) Notice: Subject to any disclaimer, the term of this patent is extended or adjusted under 35 U.S.C. 154(b) by 2039 days.

(21) Appl. No.: 11/339,659

(22) Filed: Jan. 25, 2006

(65) Prior Publication Data

US 2007/0180528 A1 Aug. 2, 2007

(51) Int. Cl.
*G06F 21/00* (2013.01)

(52) U.S. Cl.
USPC .............. 726/26; 726/22; 726/24; 726/25; 713/187; 713/188; 709/206; 709/207

(58) Field of Classification Search
USPC ............................................. 726/23, 24, 26
See application file for complete search history.

(56) References Cited

U.S. PATENT DOCUMENTS

| | | | | |
|---|---|---|---|---|
| 5,613,002 | A * | 3/1997 | Kephart et al. | 726/24 |
| 6,976,271 | B1 * | 12/2005 | Le Pennec et al. | 726/24 |
| 7,260,725 | B2 * | 8/2007 | Carmona et al. | 713/187 |
| 7,278,161 | B2 * | 10/2007 | Lingafelt et al. | 726/23 |
| 7,325,249 | B2 * | 1/2008 | Sutton et al. | 726/13 |
| 7,448,084 | B1 * | 11/2008 | Apap et al. | 726/24 |
| 7,624,446 | B1 * | 11/2009 | Wilhelm | 726/23 |
| 7,774,846 | B2 * | 8/2010 | Rothman et al. | 726/24 |
| 8,069,480 | B1 * | 11/2011 | Tarbotton et al. | 726/22 |
| 8,201,253 | B1 * | 6/2012 | Yan et al. | 726/24 |
| 2002/0073330 | A1 * | 6/2002 | Chandnani et al. | 713/200 |
| 2002/0144121 | A1 * | 10/2002 | Ellison et al. | 713/176 |
| 2002/0174137 | A1 * | 11/2002 | Wolff et al. | 707/200 |
| 2003/0093682 | A1 * | 5/2003 | Carmona et al. | 713/187 |
| 2004/0025098 | A1 * | 2/2004 | Meyer | 714/736 |
| 2005/0021994 | A1 * | 1/2005 | Barton et al. | 713/200 |
| 2005/0132206 | A1 * | 6/2005 | Palliyil et al. | 713/188 |
| 2005/0240781 | A1 * | 10/2005 | Gassoway | 713/188 |
| 2006/0130141 | A1 * | 6/2006 | Kramer et al. | 726/23 |
| 2006/0282457 | A1 * | 12/2006 | Williams | 707/102 |
| 2007/0198838 | A1 * | 8/2007 | Nonaka et al. | 713/176 |

FOREIGN PATENT DOCUMENTS

| | | | | |
|---|---|---|---|---|
| GB | 2400932 A | | 10/2004 | G06F 1/00 |
| GB | 2400933 A | * | 10/2004 | |
| WO | WO 2008/090050 A2 | | 10/2003 | G06F 1/00 |

OTHER PUBLICATIONS

Singh et al, Static verification of worm and virus behavior in binary executables using model checking, Jun. 2003, Proceedings of the 2003 IEEE, p. 298-300.*

PCT Notification of Transmittal of The International Search Report and the Written Opinion of the International Searching Authority, or the Declaration and With Attached PCT Search Report and Written Opinion, in International Application No. PCT/US2007/000294 dated Jul. 2, 2007, 11 pages.

* cited by examiner

*Primary Examiner* — Morshed Mehedi
(74) *Attorney, Agent, or Firm* — Baker Botts, L.L.P.

(57) ABSTRACT

A method for detecting a malicious program infection includes scanning data to determine whether the data exhibits one or more particular symptoms of being infected with a malicious program and, in response to determining that the scanned data exhibits the symptoms of being infected with a malicious program, comparing the scanned data to known-good data. The method also includes initiating remedial action in response to determining that the scanned data does not match the known-good data.

42 Claims, 3 Drawing Sheets

SYSTEM AND METHOD FOR REDUCING ANTIVIRUS FALSE POSITIVES

TECHNICAL FIELD

The present disclosure relates to antivirus protection and, more specifically, to a system and method for reducing antivirus false positives.

DESCRIPTION OF THE RELATED ART

The security of computer systems and other electronic technologies is routinely threatened by malicious programs such as computer viruses, Trojan horses, worms and the like. Once computers are infected with these malicious programs, the malicious programs may have the ability to damage expensive computer hardware, destroy valuable data, tie up limited computing resources or compromise the security of sensitive information.

Other types of malicious programs have been developed to deliver advertisements and covertly monitor the use of computer systems for commercial purposes. Such programs may be referred to as adware and spyware. Programs such as adware and spyware are increasingly a threat to the security and utility of computer systems.

To guard against the risk of malicious programs, antivirus programs are often employed. Antivirus programs are computer programs that can scan computer systems to detect malicious programs embedded within computer memory and infected computer files. Once malicious programs have been detected, the antivirus programs may take remedial measures such as quarantining the infected file, repairing the infected files or deleting the infected files from the computer system.

Anti-spyware programs may also be employed to detect and remove and/or deactivate instances of adware and/or spyware from infected computer systems. For the purpose of convenience, spyware and adware are referred to herein as forms of malicious programs. Additionally, anti-spyware programs may be referred to herein as a form of antivirus program.

Antivirus programs currently use a wide range of techniques to detect and remove malicious programs from infected computer systems. One technique for detecting malicious programs is to perform a virus signature scan. According to this technique, computer files, key hard disk sectors such as the boot sector and master boot record (MBR) and computer system memory are searched for the presence of virus signatures. Virus signatures are key patterns of computer code that are known to be associated with malicious programs. Virus signature scans are highly effective tools for maintaining computer system security provided that the virus signature scanner has access to a database of known virus signatures that is kept up to date. However, virus signature scans are not fool proof and non-malicious code may be improperly flagged as malicious. This is generally known as a false positive.

Another common technique for detecting and removing malicious programs is to perform a heuristic virus scan. Heuristic virus scans are able to intelligently estimate whether computer code is related to a malicious program. This technique relies on programmed logic, called heuristics, to make its determinations. Heuristic virus scans have the potential to protect computer systems against viruses that are new and unknown.

Nonetheless, although heuristic virus scans attempt to intelligently estimate whether computer code is related to a malicious program, there is always a risk that non-malicious code may be improperly categorized as malicious. This type of misdiagnosis is also generally known as a false positive.

As noted above, false positives may occur with antivirus programs utilizing signature scanning. This risk is particularly acute in light of modern designer viruses. Designer viruses are malicious programs that have been designed to specifically target a given technology. For example, a designer virus may attempt to harm an enterprise by distributing a virus that has been programmed to contain code very similar to a critical application in use by the enterprise that has been targeted for attack. Antivirus signatures may then be developed by an antivirus vendor to detect and remove this new virus. These antivirus signatures may then be installed by the enterprise wishing to keep its virus definition database up to date. However, once the new antivirus signature is installed, the antivirus program may believe the critical application is the new virus and initiate remedial measures that may include quarantining the critical application or perhaps deleting it. In this way, the antivirus program's tendency to produce false positives may be used as a tool to launch an attack against the enterprise that uses the antivirus program.

Anti-spyware programs may function similarly to antivirus programs. As a result, anti-spyware programs may also run the risk of generating false positives that represent a similar threat to the proper functioning of computer systems.

Because false positives may trigger unwarranted remedial measures, a false positive may result in the deactivation of a critical application. Because even a temporary outage of a critical application can be very costly to an enterprise, minimizing false positives for antivirus programs and anti-spyware programs is of the utmost importance.

SUMMARY

In accordance with the present invention, the disadvantages and problems associated with computer systems have been substantially reduced or eliminated. In particular, a system and method is provided that supports improved techniques for detecting infection by malicious programs.

According to a particular embodiment of the present invention, a method for detecting a malicious program infection includes scanning data to determine whether the data exhibits one or more particular symptoms of being infected with a malicious program and, in response to determining that the scanned data exhibits the symptoms of being infected with a malicious program, comparing the scanned data to known-good data. The method also includes initiating remedial action in response to determining that the scanned data does not match the known-good data.

According to another embodiment of the present invention, a system for detecting a malicious program infection includes a scanning unit, a comparing unit, and a remedial unit. The scanning unit scans data to determine whether the data exhibits one or more particular symptoms of being infected with a malicious program. The comparing unit compares the scanned data to known-good data in response to the scanning unit determining that the scanned data exhibits the symptoms of being infected with a malicious program. The remedial unit initiates remedial action in response to the comparing unit determining that the scanned data does not match the known-good data.

Technical advantages of certain embodiments of the present invention include a reduction in the number of falsely positive results produced when scanning for infection by malicious programs. Additionally, particular embodiments of the present invention may reduce disruptions caused by the techniques utilized to detect malicious infections. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

To reduce the frequency of false positives in antivirus programs and anti-spyware programs, particular embodiments of the present disclosure may seek to verify that potential malicious programs, for example an executable file that has matched a virus signature, are not actually clean files (files that are free of malicious program infection) before remedial action is taken. By verifying that a positive detection of a malicious program is not a false positive, false positives may be reduced and the harmful effects of unwarranted remedial measures may be avoided.

Figure 1:
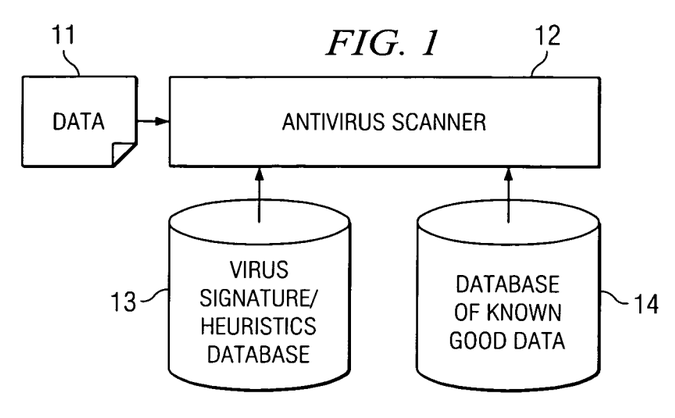
FIG. 1 is a block diagram illustrating malicious program detection according to an embodiment of the present disclosure.
Figure 2:
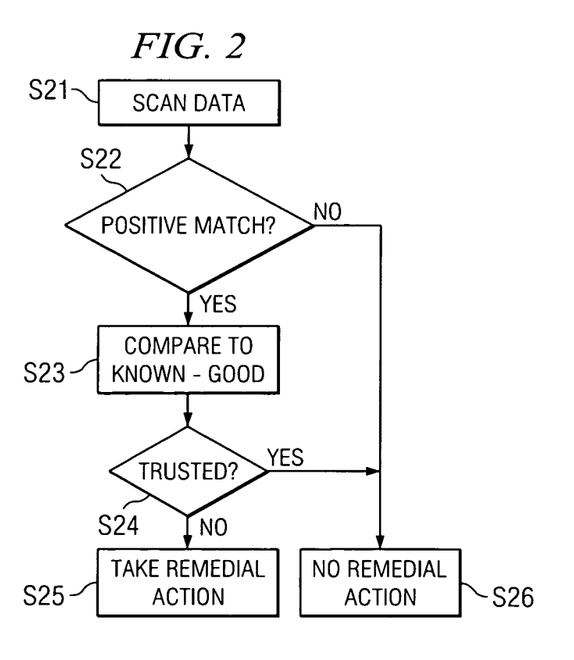
FIG. 2 is a flow chart illustrating a method for detecting malicious programs according to the embodiment of the present disclosure illustrated in FIG. 1.

FIG. 1 is a block diagram illustrating malicious program detection according to an embodiment of the present disclosure. FIG. 2 is a flow chart illustrating a method for detecting malicious programs according to the embodiment of the present disclosure illustrated in FIG. 1. Data 11 may be scanned by an antivirus scanner 12 to determine if data 11 is suspected of being a malicious program (Step S21). In particular embodiments, scanner 12 may scan data 11 to determine whether data 11 exhibits one or more particular symptoms of being infected by a malicious program. Data 11 may be, for example, one or more executable files or portions thereof, one or more non-executable files or portions thereof, one or more documents or portions thereof, one or more database entries or portions thereof, pseudo code or any other unit of digital information, or any combination thereof.

Where the antivirus scanner 12 is a virus signature scanner, data 11 may be suspected of being a malicious program if data 11 matches a virus signature from a virus signature database 13. As a result, in such embodiments, one symptom that scanner 12 may attempt to identify is a match between data 11 and a virus in virus signature database 13. Alternatively, where the antivirus scanner 12 is a heuristic virus scanner, data 11 may be suspected of being infected with a malicious program if data 11 is determined to be infected with a malicious program based on heuristics from a heuristics database 13. As a result, in such embodiments, one symptom that antivirus scanner 12 may attempt to identify is whether the application of heuristics included in heuristics database 13 to data 11 suggests that data 11 is infected with a malicious program.

If there is no positive match (e.g., data 11 is found to be clean) (No, Step S22) then no remedial action is taken (Step S26). The next data may then be scanned. If there is a positive match (e.g., data 11 is found to be suspect) (Yes, Step 22), then the data may be compared to known-good data (Step S23), for example, from a database of known-good data 14.

Known-good data may be a representation of how a particular section of data should appear when it is clean. Known-good data may be data whose authenticity is sanctioned by a trusted source. In particular embodiments, known-good data may be a copy of the data known to be clean. In such a case, comparing the data to the known-good data may comprise a bit-by-bit comparison of the suspect data to the clean copy of the data. If the suspect data matches the known-good data then the suspect data may be trusted.

If the suspect data is trusted (Yes, Step S24) then no remedial action is taken (Step S26). If the suspect data is found not to be trusted (No, Step S24) then remedial action may be taken (Step S25).

Because many malicious programs infect host data by modifying, adding and/or deleting code, infected data will most likely appear as a modified and/or tampered with version of the original clean data. It is this tendency that may be used by particular embodiments of the present disclosure to verify that data has actually been infected with malicious code prior to the commencement of remedial action.

It may therefore be desirable to update the database of known-good data 14 as data is legitimately modified. For example, data may be an executable program that was recently upgraded with a security patch. After the addition of the patch, an updated version of the known-good data may be stored in database 14 to maintain efficacy.

The known-good data and/or a database of known-good data 14 may be located locally on the computer system implementing an embodiment of the present disclosure. Alternatively, the known-good data may be located remotely, for example over a computer network, for example a LAN or the Internet. The known-good data may be stored in a database on a network server that is managed by the user. For example, the database of known-good data 14 may be maintained by an enterprise as a backend database. Alternatively, the database of known-good data 14 may be part of a database on a server managed by an antivirus vendor. Alternatively, a vendor of a program may make known-good data available for its products. Alternatively, known-good data may be integrated with the data itself thereby eliminating the need for a database of known-good data.

Figure 3:
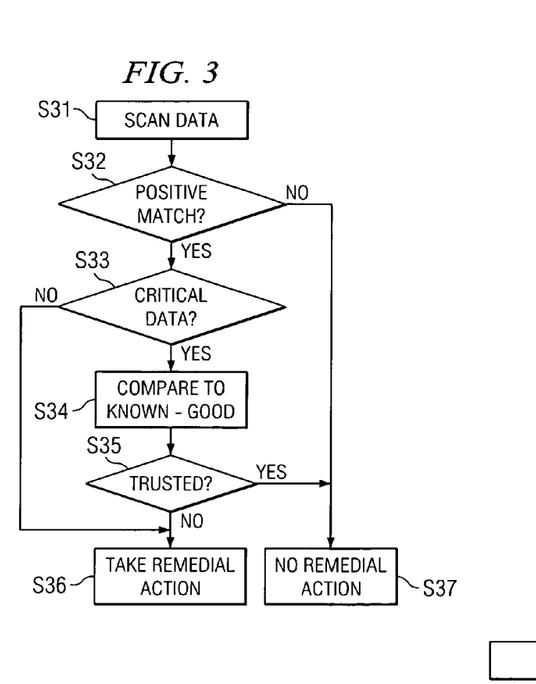
FIG. 3 is a flow chart illustrating a method for detecting malicious programs that compare suspect critical files to known-good data.

Because file sizes have the potential to be very large, storing full copies of files as known-good data may use a large quantity of storage space, large amounts of processing capacity and long processing times. The following techniques may be utilized to make the present system even more efficient According to an embodiment of the present disclosure, the practice of comparing suspect data to known-good data may be reserved for critical data. Critical data may be, for example, data that is of a heightened importance. In particular embodiments, critical data may include files that are fundamental to the proper operation of the user and/or would cause hardship to the user if the files were made unavailable. Critical data may include files specified in an enterprise's disaster recovery plan. For example, critical data may be files that relate to key infrastructure of the enterprise. FIG. 3 is a flow chart illustrating a method for detecting malicious programs that compare suspect critical data to known-good data according to this embodiment.

The data may be scanned, for example, using an antivirus program (Step S31). If the scan results in a positive match, for example a virus signature match or a heuristic match, (Yes, Step S32) then it is next determined whether the data is critical data (Step S33). In determining whether data is critical data, a database of critical data may be consulted. In particular embodiments, the database of critical data may list each file that is considered critical. Enterprises may already maintain a list of critical data as part of their disaster recovery plan and such lists may be used to provide the database of critical data.

If data that has resulted in a positive match (Yes, Step S32) and the data is not considered critical data (No, Step S33), then remedial action may be taken (Step S36). However, if the data is considered critical data (Yes, Step S33) then the data may be compared to known-good data (Step S34). If the data is then determined to be trusted, for example if it matches the known-good data, (Yes, Step S35) then no remedial action need be taken (Step S37). If, however, the data is determined not to be trusted, for example if it fails to match the known-good data, (No, Step S35) then remedial action may be taken (Step S36).

By limiting comparison of only matched critical data to known-good data, antivirus programs and anti-spyware programs may function more efficiently while reducing the potential for false positives to result in important files being taken offline.

Using clean copies of files as known-good data may take a long time and may require a very large database. According to embodiments of the present disclosure, a digital signature may be used as known-good data.

A digital signature may include a sequence of bits conforming to one or more standards that has been generated based on specific data. Digital signatures may be used to establish that the specific data is authentic and has not been altered. Digital signatures may utilize cryptographic protocols to make it difficult for the digital signature itself to be compromised. For example, a digital signature may utilize public key cryptography.

Digital signatures may be generated based on data of any size. For example, digital signatures may be generated based on a section of a file, a file or a group of files. In particular embodiments, when digital signatures are stored in a database of known-good data, the known-good data used to generate the digital signatures is of the same size as the data being scanned. For example, where the database of known-good data comprises digital signatures for whole files, whole files should be scanned.

Examples of digital signatures include, but are not limited to, a checksum, hash value, and/or cyclic redundancy check (CRC). These algorithms may be used to verify that data is authentic and has not been modified. For example, a checksum may be calculated for a file that is known to be clean and that checksum may be included in a database of known-good data. When the file is compared to the known-good data, a new checksum may be calculated for that file and the checksum may be compared with the checksum of the known-good data from the database of known-good data.

Another example of a digital signature may be to perform a bit-by-bit comparison of a compressed version of data with a compressed version of the data that is known to be good. Compressing the data may allow for a faster comparison as well as allow for the data to take up less space in a database of known-good data. Storing an actual clean copy of the data and/or a compressed clean copy of the data allows for the additional advantage of allowing the antivirus program to replace infected data with a copy of data known to be clean when it is otherwise determined that remedial actions should be taken.

Other examples of digital signatures may be used. Some of which incorporate additional security measures to make it more difficult for file tampering to go unnoticed. Such digital signatures may be secure digital signatures.

Other examples of digital signatures that may be used are cryptographic hash functions. A cryptographic hash function is an algorithm for generating a comparatively short string (a message digest) from even larger data such that even a small change made to the data is overwhelmingly likely to result in a markedly distinguishable message digest. By using a secure cryptographic hash function to generate a digital signature, it is practically impossible for an attacker to find a way of tampering with data such that the tampered-with data produces the same message digest.

One example of a cryptographic hash function is the Message-Digest Algorithm 5 (MD5). MD5 produces a 128-bit message digest regardless of the size of the original data. The MD5 message digest may be represented as a 32-digit hexadecimal number. MD5 is a secure cryptographic hash function that is capable of producing a markedly distinguishable message digest for two sets of data that exhibit very small differences. For example, the data "SYSTEM AND METHOD FOR REDUCING ANTIVIRUS FALSE POSITIVES" has an MD5 hash value of "d7fdad0264b6bb6cd1a266fcf097f12c" while the data "SYSTEM AND METHOD FOR REDUCING ANTIVIRUS FALSE POSITEVES" has an MD5 hash value of "666164f55ef1381d1787e25b5169aae2".

Another example of a cryptographic hash function is the Secure Hash Algorithm (SHA) set of related cryptographic hash algorithms. One popular SHA cryptographic hash algorithm is SHA-1. SHA-1 produces a 160-bit message digest. Other variants of SHA are also available which produce longer message digests, for example SHA-256, SHA-384 and SHA-512. Larger message digests further reduce the risk of accidental collision (having two distinct data sets with the same message digest). For example, the data "SYSTEM AND METHOD FOR REDUCING ANTIVIRUS FALSE POSITIVES" has a SHA-1 hash value of "86f4a664bf84daa2e92abd6565adb7 ccd 1104812" while the data "SYSTEM AND METHOD FOR REDUCING ANTIVIRUS FALSE POSITEVES" has a SHA-1 hash value of "75a7a87afed3c3224f3262827095485dd859e126".

Figure 4:
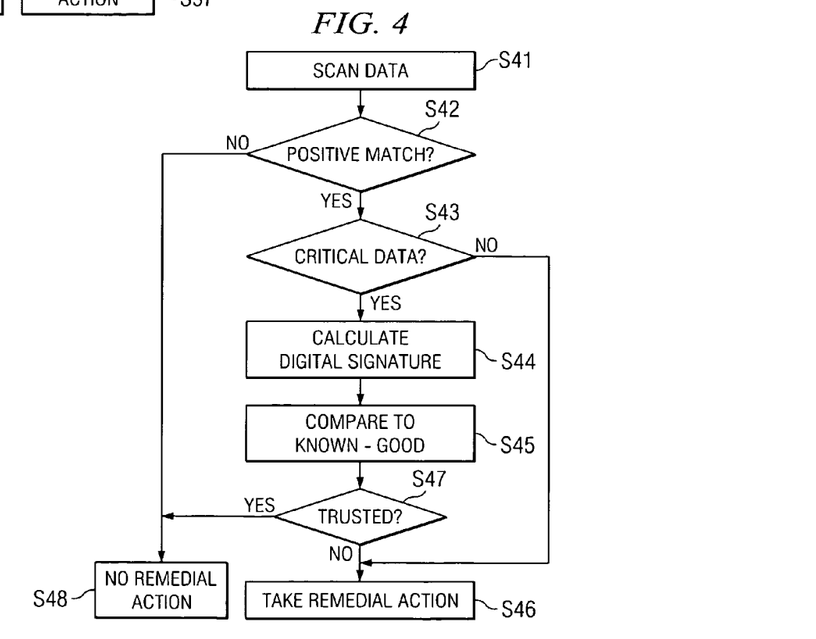
FIG. 4 is a flow chart illustrating a method for detecting malicious programs using digital signatures according to an embodiment of the present disclosure.

FIG. 4 is a flow chart illustrating a method for detecting malicious programs using digital signatures according to an embodiment of the present disclosure. Digital signatures may be calculated from data that is known to be clean. For example, digital signatures may be calculated for each file in use by a computer system running an antivirus program as new files are installed onto the computer system and/or as existing files are legitimately modified. Digital signatures may be calculated for some or all data on the computer system, for example, digital signatures may be calculated for critical files. The digital signatures may be secure digital signatures or non-secure digital signatures. Digital signatures may be calculated using one or more algorithms. Digital signatures calculated for known-good data may be stored in a database of known-good data.

When an antivirus scan is performed on data (Step S41), it is determined whether the data is believed to be infected with a malicious program. If it is not (No, Step 42) then no remedial action need be taken (Step S48). If the data is believed to be infected (Yes, Step S42) then it may be determined whether the data is critical data (Step S43). If the data is not critical data (No, Step S43) then remedial action may be taken (Step S46). If the data is critical data (Yes, Step S43) then a digital signature may be calculated for the data (Step S44), for example using the same generation algorithm that was used to generate the digital signatures stored in the database of known-good data. The calculated digital signature may then be compared to the digital signature for the clean copy of the same data that is in the database of known-good data (Step S45). If the digital signatures match, then the data may be trusted (Yes, Step S47) and no remedial action need be taken (Step S48). If the digital signatures do not match then the data may not be trusted (No, Step S47) and remedial action may be taken (Step S46).

Alternatively, the digital signature of a known-good copy of data may be incorporated into the file itself. In such a case, a database of known-good data may not need to be maintained. When the data is scanned and the digital signature generated, the generated digital signature may be compared against the known-good data that is incorporated into the file itself. In such a case, it may be preferable to utilize secure digital signatures.

According to some embodiments of the present disclosure, comparing the calculated digital signature to a digital signature within a database of known-good data may include checking to see if a matching digital signature exists within the database of known-good data for a name associated with the data being compared, for example a file name. Alternatively, the digital signature being compared may be directly searched for within the database of known-good data. For example, a binary search may be used to see if the digital signature being compared is present in the list of known-good data.

Embodiments of the present disclosure may be implemented on a pre-existing antivirus program and/or anti-spyware program. For example, the functionality of comparing data that is believed to be infected against known-good data may be added to a standard antivirus/anti-spyware program as a runtime extension. Alternatively, embodiments of the present disclosure may be implemented as a stand-alone antivirus/anti-spyware program.

Figure 5:
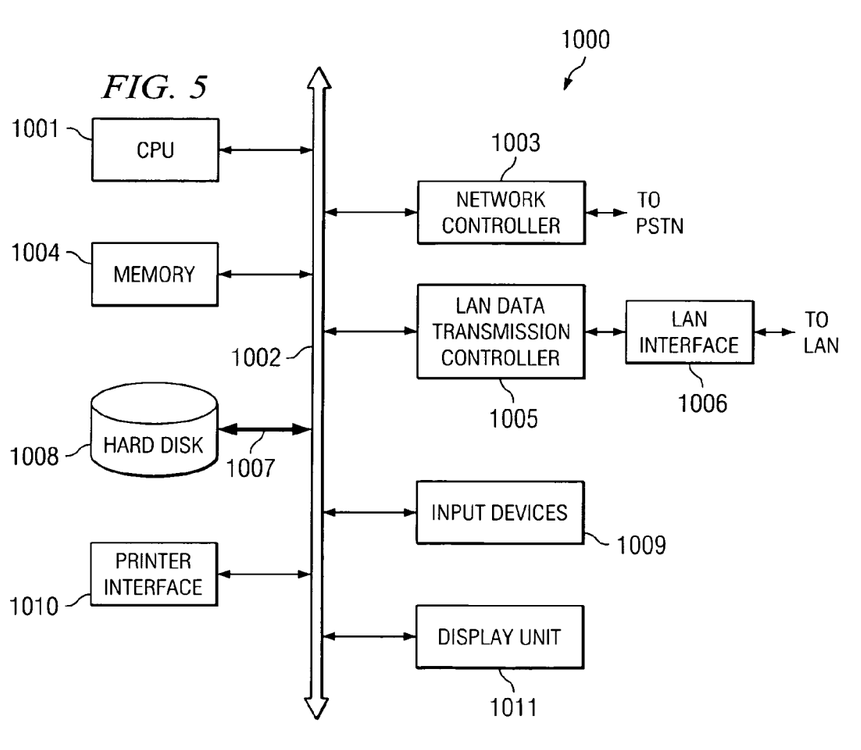
FIG. 5 shows an example of a computer system capable of implementing the method and apparatus according to embodiments of the present disclosure.

FIG. 5 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on recording media locally accessible by the computer system and/or accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc.

As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A computer-implemented method for detecting a malicious program infection, comprising:
   determining whether data exhibits one or more particular symptoms of being infected with a malicious program by scanning the data;
   in response to determining that the scanned data exhibits the symptoms of being infected with a malicious program, verifying that the scanned data is infected with a malicious program by comparing the scanned data to known-good data;
   if the scanned data does not match the known-good data and if the scanned data exhibits symptoms of being infected with the malicious program, initiating remedial action on the scanned data; and
   if the scanned data does match the known-good data and if the scanned data exhibits symptoms of being infected with the malicious program, determining not to initiate remedial action on the scanned data.

2. The method of claim 1, wherein the malicious program comprises at least one of a computer virus, a Trojan horse, a worm, spyware, and adware.

3. The method of claim 1, wherein determining whether the data exhibits one or more particular symptoms of being infected with a malicious program comprises:
   comparing the data with one or more known virus signatures; and
   determining that the data exhibits particular symptoms of being infected with a malicious program in response to determining that the data matches one or more of the known virus signatures.

4. The method of claim 1, wherein determining whether the data exhibits particular symptoms of being infected with a malicious program comprises performing a heuristic scan on the data to determine whether the data exhibits particular symptoms of being infected with a malicious program.

5. The method of claim 1, wherein the known-good data comprises a copy of the scanned data that is known to be clean, and wherein comparing the scanned data to the known-good data comprises performing a bit-by-bit comparison of the scanned data to the copy of the data known to be clean.

6. The method of claim 1, wherein the known-good data comprises a compressed copy of the data that is known to be clean, and wherein comparing the scanned data to the known-good data comprises:
   compressing the scanned data; and
   performing a bit-by-bit comparison of the compressed data to the compressed copy of the data known to be clean.

7. The method of claim 1, wherein the known-good data comprises a checksum of the data that is known to be clean, and wherein comparing the scanned data to the known-good data comprises:
   calculating a checksum of the scanned data; and
   comparing the calculated checksum of the scanned data to the checksum of the data that is known to be clean.

8. The method of claim 1, wherein the known-good data comprises a cyclic redundancy check (CRC) of the data that is known to be clean, and wherein comparing the data to the known-good data comprises:
  calculating a CRC of the scanned data; and
  comparing the calculated CRC of the scanned data to the CRC of the data that is known to be clean.

9. The method of claim 1, wherein the known-good data comprises a hash value of the data that is known to be clean, and wherein comparing the data to the known-good data comprises:
  calculating a hash value of the scanned data; and
  comparing the hash value of the scanned data to the hash value of the data that is known to be clean.

10. The method of claim 1, wherein the known-good data comprises a digital signature of the data that is known to be clean, and wherein comparing the data to the known-good data comprises:
  calculating a digital signature of the scanned data; and
  comparing the digital signature of the scanned data to the digital signature of the data that is known to be clean.

11. The method of claim 1, wherein the known-good data comprises a cryptographic hash function message digest of the data that is known to be clean, and wherein comparing the scanned data to the known-good data comprises:
  calculating a cryptographic hash function message digest of the scanned data; and
  comparing the cryptographic hash function message digest of the scanned data to the cryptographic hash function message digest of the data that is known to be clean.

12. The method of claim 11, wherein comparing the cryptographic hash function message digest of the scanned data to the cryptographic hash function message digest of the data that is known to be clean comprises attempting to match the cryptographic hash function message digest of the scanned data to one or more entries in a list of cryptographic hash function message digests of data that is known to be clean.

13. The method of claim 12, wherein attempting to match the cryptographic hash function message digest of the scanned data to entries in a list of cryptographic hash function message digests of data that are known to be clean comprises performing a binary search of the list of cryptographic hash function message digests of data that is known to be clean for the cryptographic hash function message digest of the scanned data.

14. The method of claim 1, wherein the remedial action is chosen from the group consisting of: deleting the data and quarantining the data.

15. The method of claim 1, wherein initiating the remedial action comprises initiating the remedial action without further scanning the scanned data.

16. The method of claim 1, wherein the remedial action comprises repairing the data based on the known-good data.

17. The method of claim 1, wherein comparing the scanned data to known-good data comprises comparing the scanned data to known-good data as part of executing a runtime extension to an antivirus program.

18. The method of claim 1, wherein comparing the scanned data to known-good data in response to determining that the scanned data exhibits particular symptoms of being infected with a malicious program comprises:
  in response to determining that the scanned data exhibits particular symptoms of being infected, determining whether the scanned data comprises critical data;
  comparing the scanned data to known-good data in response to determining that the scanned data exhibits particular symptoms of being infected with a malicious program and that the scanned data comprises critical data.

19. The method of claim 18, wherein determining whether the scanned data comprises critical data comprises determining whether the scanned data is listed within a list of critical data.

20. A system for detecting a malicious program infection, comprising at least one hardware processor configured to:
  determine whether the data exhibits one or more particular symptoms of being infected with a malicious program by scanning the data;
  in response to determining that the scanned data exhibits the symptoms of being infected with a malicious program, verify that the scanned data is infected with a malicious program by comparing the scanned data to known-good data;
  if the scanned data does not match the known-good data and if the scanned data exhibits symptoms of being infected with the malicious program, initiate remedial action on the scanned data; and
  if the scanned data does match the known-good data and if the scanned data exhibits symptoms of being infected with the malicious program, determine not to initiate remedial action on the scanned data.

21. The system of claim 20, wherein the malicious program comprises at least one of a computer virus, a Trojan horse, a worm, spyware, and adware.

22. The system of claim 20, wherein determining whether the data exhibits one or more particular symptoms of being infected with the malicious program comprises:
  performing a virus signature scan on the data to compare the data with one or more known virus signatures; and
  determining that the data exhibits particular symptoms of being infected with a malicious program in response to the data matching one or more of the one or more known virus signatures.

23. The system of claim 20, wherein determining whether the data exhibits one or more particular symptoms of being infected with the malicious program comprises performing a heuristic scan on the data.

24. The system of claim 20, wherein the known-good data comprises a copy of the scanned data that is known to be clean, and wherein comparing the scanned data to the known-good data comprises performing a bit-by-bit comparison of the scanned data to the copy of the scanned data known to be clean.

25. The system of claim 20, wherein the known-good data comprises a compressed copy of the data that is known to be clean, and wherein comparing the scanned data to the known-good data comprises:
  compressing the scanned data; and
  performing a bit-by-bit comparison of the compressed data to the compressed copy of the data that is known to be clean.

26. The system of claim 20, wherein the known-good data comprises a checksum of data that is known to be clean, and wherein comparing the scanned data to the known-good data comprises:
  calculating a checksum of the scanned data; and
  comparing the calculated checksum of the scanned data to the checksum of the data that is known to be clean.

27. The system of claim 20, wherein the known-good data comprises a cyclic redundancy check (CRC) of the data that is known to be clean, and wherein comparing the scanned data to the known-good data comprises:

calculating a CRC of the scanned data; and
comparing the calculated CRC of the scanned data to the CRC of the data that is known to be clean.

28. The system of claim 20, wherein the known-good data comprises a hash value of the data that is known to be clean, and wherein comparing the scanned data to the known-good data comprises:
calculating a hash value of the scanned data; and
comparing the hash value of the scanned data to the hash value of the data that is known to be clean.

29. The system of claim 20, wherein the known-good data comprises a digital signature of the data that is known to be clean, and wherein comparing the scanned data to the known-good data comprises:
calculating a digital signature of the scanned data; and
comparing the digital signature of the scanned data to the digital signature of the data that is known to be clean.

30. The system of claim 20, wherein the known-good data comprises a cryptographic hash function message digest of the data that is known to be clean, and wherein comparing the scanned data to the known-good data comprises:
calculating a cryptographic hash function message digest of the scanned data; and
comparing the cryptographic hash function message digest of the scanned data to the cryptographic hash function message digest of the data that is known to be clean.

31. The system of claim 30, wherein comparing the cryptographic hash function message digest of the scanned data to the cryptographic hash function message digest of the data that is known to be clean comprises attempting to match the cryptographic hash function message digest of the scanned data to one or more entries in a list of cryptographic hash function message digests of data that is known to be clean.

32. The system of claim 31, wherein comparing the cryptographic hash function message digest of the scanned data to the cryptographic hash function message digest of the data that is known to be clean comprises performing a binary search of the list of cryptographic hash function message digests of data that is known to be clean for the cryptographic hash function message digest of the scanned data.

33. The system of claim 20, wherein the remedial action is chosen from the group consisting of: a deleting unit for deleting the data and a quarantining unit for quarantining the data.

34. The system of claim 20, wherein initiating the remedial action comprises initiating the remedial action without further scanning of the scanned data.

35. The system of claim 20, wherein the remedial action comprises repairing the data based on the known-good data.

36. The system of claim 20, wherein comparing the scanned data to known-good data comprises comparing the scanned data to known-good data as part of a runtime extension to an antivirus program.

37. The system of claim 20, wherein the at least one hardware processor is further configured to:
determine whether the scanned data comprises critical data in response to determining that the scanned data exhibits particular symptoms of being infected with a malicious program, and
wherein comparing the scanned data to the known-good data comprises comparing the scanned data to the known-good data in response to determining that the scanned data exhibits particular symptoms of being infected with a malicious program and determining that the scanned data comprises critical data.

38. The system of claim 37, wherein determining whether the scanned data comprises critical data by determining whether the scanned data is listed within a list of critical data.

39. A computer system comprising:
a processor; and
a program storage device readable by the processor, embodying computer executable code, the processor operable when executing the code to:
determine whether the data exhibits one or more particular symptoms of being infected with a malicious program by scanning the data;
in response to determining that the scanned data exhibits the symptoms of being infected with a malicious program, verify that the scanned data is infected with a malicious program by comparing the scanned data to known-good data;
if the scanned data does not match the known-good data and if the scanned data exhibits symptoms of being infected with the malicious program, initiate remedial action on the scanned data; and
if the scanned data does match the known-good data and if the scanned data exhibits symptoms of being infected with the malicious program, determine not to initiate remedial action on the scanned data.

40. The computer system of claim 39, wherein:
the processor is operable to compare the scanned data to known-good data in response to determining that the scanned data exhibits particular symptoms of being infected with a malicious program by:
determining, in response to determining that the scanned data exhibits particular symptoms of being infected, whether the scanned data comprises critical data;
comparing, in response to determining that the scanned data exhibits particular symptoms of being infected with a malicious program and that the scanned data comprises critical data, the scanned data to known good data without further scanning the scanned data.

41. A non-transitory computer readable medium including computer executable code for detecting a malicious program infection, comprising:
code for determining whether the data exhibits one or more particular symptoms of being infected with a malicious program by scanning the data;
code for verifying that the scanned data is infected with a malicious program by comparing the scanned data to known-good data in response to a determination that the scanned data exhibits the symptoms of being infected with a malicious program;
code for initiating, if the scanned data does not match the known-good data and if the scanned data exhibits symptoms of being infected with the malicious program, remedial action on the scanned data; and
code for determining, if the scanned data does match the known-good data and if the scanned data exhibits symptoms of being infected with the malicious program, not to initiate remedial action on the scanned data.

42. A system for detecting a malicious program infection, comprising:
means for determining whether the data exhibits one or more particular symptoms of being infected with a malicious program by scanning the data;
means for verifying that the scanned data is infected with a malicious program by comparing the scanned data to known-good data in response to a determination that the scanned data exhibits the symptoms of being infected with a malicious program;
means for initiating, if the scanned data does not match the known-good data and if the scanned data exhibits symptoms of being infected with the malicious program, remedial action on the scanned data; and means for determining, if the scanned data does match the known-good data and if the scanned data exhibits symptoms of being infected with the malicious program, not to initiate remedial action on the scanned data.

* * * * *